United States Patent
Hashimoto (10) Patent No.: US 6,434,278 B1
(45) Date of Patent: Aug. 13, 2002

(54) GENERATING THREE-DIMENSIONAL MODELS OF OBJECTS DEFINED BY TWO-DIMENSIONAL IMAGE DATA

(75) Inventor: Roy T. Hashimoto, Redwood, CA (US)

(73) Assignee: Enroute, Inc., Palo Alto, CA (US)

( * ) Notice: Subject to any disclaimer, the term of this patent is extended or adjusted under 35 U.S.C. 154(b) by 0 days.

(21) Appl. No.: 09/533,223

(22) Filed: Mar. 23, 2000

Related U.S. Application Data (63) Continuation of application No. PCT/US98/19700, filed on Sep. 22, 1998.
(60) Provisional application No. 60/059,735, filed on Sep. 23, 1997.

(51) Int. Cl.$^7$ .................................................. G06K 9/36
(52) U.S. Cl. ...................... 382/285; 382/154; 382/195; 382/291; 345/583; 345/653; 345/654
(58) Field of Search ................................ 382/285, 118, 382/115, 286, 287, 154, 195, 266, 291; 345/419, 581, 582, 583, 653, 654, 427

(56) References Cited

U.S. PATENT DOCUMENTS

| | | | |
|---|---|---|---|
| 5,701,403 A | | 12/1997 | Watanabe .................... 345/419 |
| 5,706,416 A | | 1/1998 | Mann et al. ................. 345/427 |
| 5,742,291 A | * | 4/1998 | Palm ........................... 345/646 |
| 5,748,199 A | | 5/1998 | Palm ........................... 345/427 |
| 5,844,573 A | * | 12/1998 | Poggio et al. ............... 345/441 |
| 5,982,912 A | * | 11/1999 | Fukui et al. ................. 382/118 |
| 5,990,901 A | * | 11/1999 | Lawton et al. .............. 382/115 |
| 6,046,745 A | * | 4/2000 | Moriya et al. .............. 345/420 |
| 6,283,858 B1 | * | 9/2001 | Hayes, Jr. et al. .......... 345/418 |

FOREIGN PATENT DOCUMENTS

WO    WO 98 12504 A    3/1998

OTHER PUBLICATIONS

Richard I. Hartley, "Projective Reconstruction and Invariants from Multiple Images", 8180 IEEE Transactions on Pattern Analysis and Machine Intelligence, Oct. 16, 1994, No. 10, New York pp. 1036–1041.
Mann, S. and R.W. Picard, "Video Orbits of the Projective Group: A New Prospective on Image Mosaicing", MIT Media Laboratory Perceptual Computing Section Technical Report No. 338, pp. 1–17.
Szeliski, Richard, "Image Mosaicing for Tele–Reality Applications", Cambridge Research Laboratory Technical Report Series, May 1994, pp. 1–30.
Haeberli, Paul and Eyal Ofek, "Automatic Panoramic Image Merging", 2 pp., http://www.sgi.com/grafica/merge/indes.html.
Dana, Peter H. "Map Projection Overview", pp. 1–8, http://www.utexas.edu/depts/grg/gcraft/notes/mapproj.html.
Tong, Zin and Krishna Nayak, "Image Registration Using Phase Correlation", EE 262 Project Report, 3 pp., http://www=leland.stanford.edu/~xin/ee262/report/report.html.

* cited by examiner

*Primary Examiner*—Leo Boudreau
*Assistant Examiner*—Sheela Chawan
(74) *Attorney, Agent, or Firm*—Fish & Richardson P.C.

(57) ABSTRACT

A three-dimensional model of an object can be generated using a computer system by identifying reference points in two or more 2D representations of the object to be modeled, and deriving 3D positional data based on an application of an initial estimation model to the identified reference points. A texture-mapped version of the 3D model can be generated by mapping texture information from the 2D representations onto the derived 3D positional data.

20 Claims, 14 Drawing Sheets

GENERATING THREE-DIMENSIONAL MODELS OF OBJECTS DEFINED BY TWO-DIMENSIONAL IMAGE DATA

This is a continuation of PCT application Ser. No. PCT/US98/19700, filed Sep. 22, 1998, which claims priority from U.S. provisional application Ser. No. 60/059,735, filed Sep. 23, 1997, (now abandoned).

BACKGROUND

This invention relates to the computer-based generation of three-dimensional (3D) models of objects defined by two-dimensional (2D) image data.

A traditional image, such as a photograph, displays a 3D object in two dimensions. For example, a digitized photograph represents an object with two-dimensional arrays of pixel values. Efforts have been made to construct a 3D geometric model of an object from 3D image data that has been derived from a traditional 2D representation of the object. Computer-derived 3D image data can be used to render images of the object from a variety of viewpoints and find application in a wide variety of fields including computer animation, virtual reality applications, computer games, movies, environmental modeling, and medicine.

Figure 2:
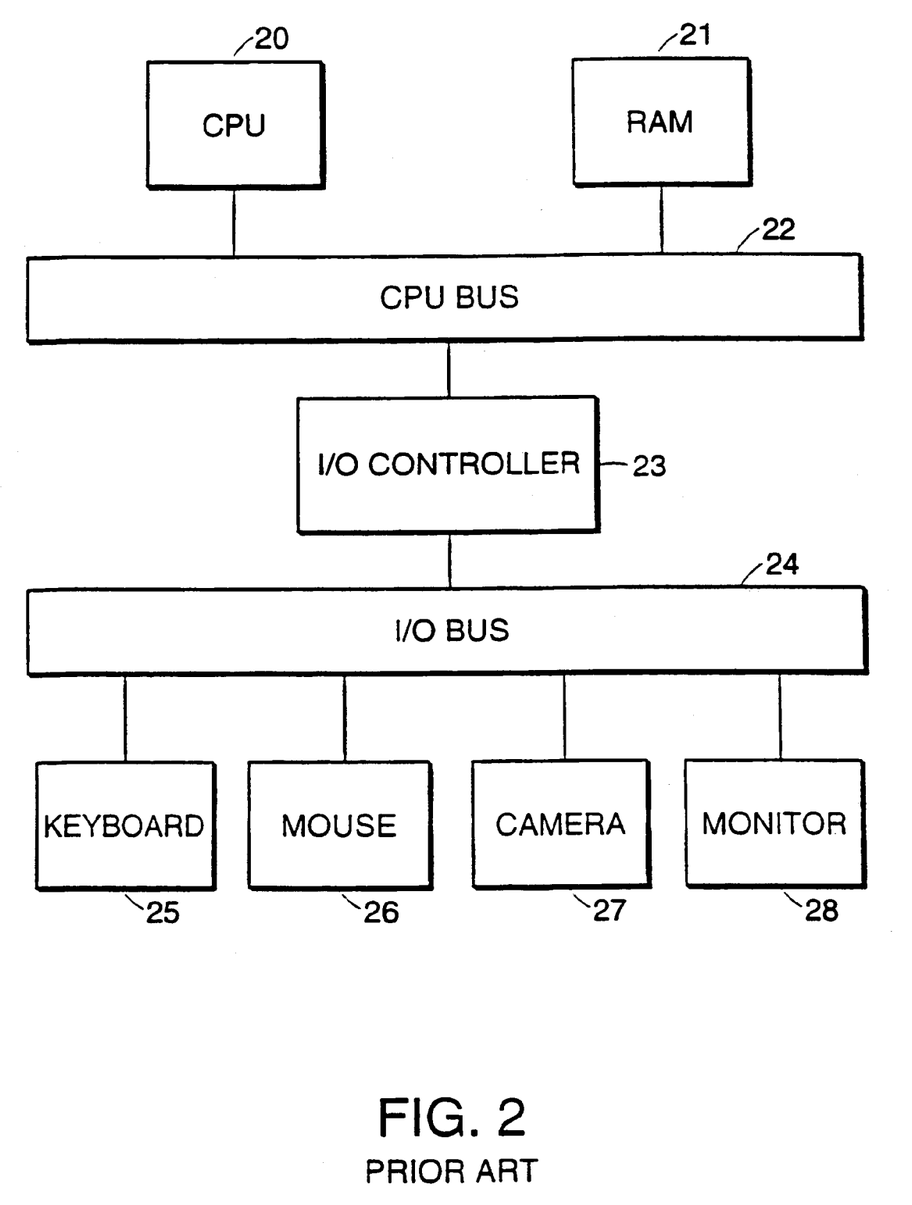
FIG. 2 is a block diagram of a computer system.

The computer system illustrated in FIG. 2 represents a typical hardware setup for running software that allows a user to generate 3D models from 2D images. The computer system of FIG. 2 includes a CPU 20, RAM 21, and an input/output (I/O) controller 23 coupled by a CPU bus 22. The I/O controller 23 also is coupled by an I/O bus 24 to I/O devices such as a keyboard 25, a mouse 26, a camera 27, and a monitor 28.

SUMMARY

In one aspect, generally, a three-dimensional model of an object can be generated using a computer system by identifying reference points in two or more 2D representations of the object to be modelled, and deriving 3D positional data based on an application of an initial estimation model to the identified reference points. A texture-mapped version of the 3D model can be generation by mapping texture information from the 2D representations onto the derived 3D positional data.

In another aspect, generally, a computer-implemented method for generating 3D image data descriptive of an object includes receiving 2D image data for at least two input images of an object, each input image representing a different viewpoint of the object. 2D position data for reference points of the object are determined from the 2D image data, each of the reference points being included in at least two of the input images. If camera parameters for the input images are not known, (i) camera parameters for each of the input images are derived, and (ii) 3D position data for the reference points are derived, based on the 2D position data for the reference points of the input images. A 3D texture-mapped model of the object is created by texture mapping from the 2D image data for the input images using the camera parameters for the input images and the 3D position data for reference points of the object.

In another aspect, generally, a computer-implemented method for generating 3D image data of a head includes receiving 2D image data for at least two input photographs of a head, each input photograph corresponding to a different viewpoint of the head. 2D position data for reference points of the head are determined from the 2D image data based on received user input indicating reference points in the input photographs, each of the reference points being included in at least two of the input photographs. Based on the 2D position data for the reference points of the input photographs, camera parameters for each of the input photographs and 3D position data for the reference points are derived using a non-linear optimization method beginning with an initial approximation. The non-linear optimization method includes determining a current approximation for camera parameters for input images and 3D positions for reference points based on the initial approximation. The following procedures are repeated iteratively until a termination criterion is met: (i) determining an error metric based on reconstructed 2D position data for reference points of input images based on the current approximation, and (ii) updating the current approximation. Then, 3D image data for the head are determined by texture mapping from the 2D image data for the input photographs, using the camera parameters for the input photographs and the 3D position data for reference points of the heads; and a 2D image is rendered from the 3D image data Advantages of the invention include the ability to generate high-quality, low-polygon count 3D image data for an object represented in two dimensions. Moreover, conventional hardware may be used to generate the 3D image data for the objects.

Other advantages and features will become apparent from the following description and from the claims.

DETAILED DESCRIPTION

Figure 1:
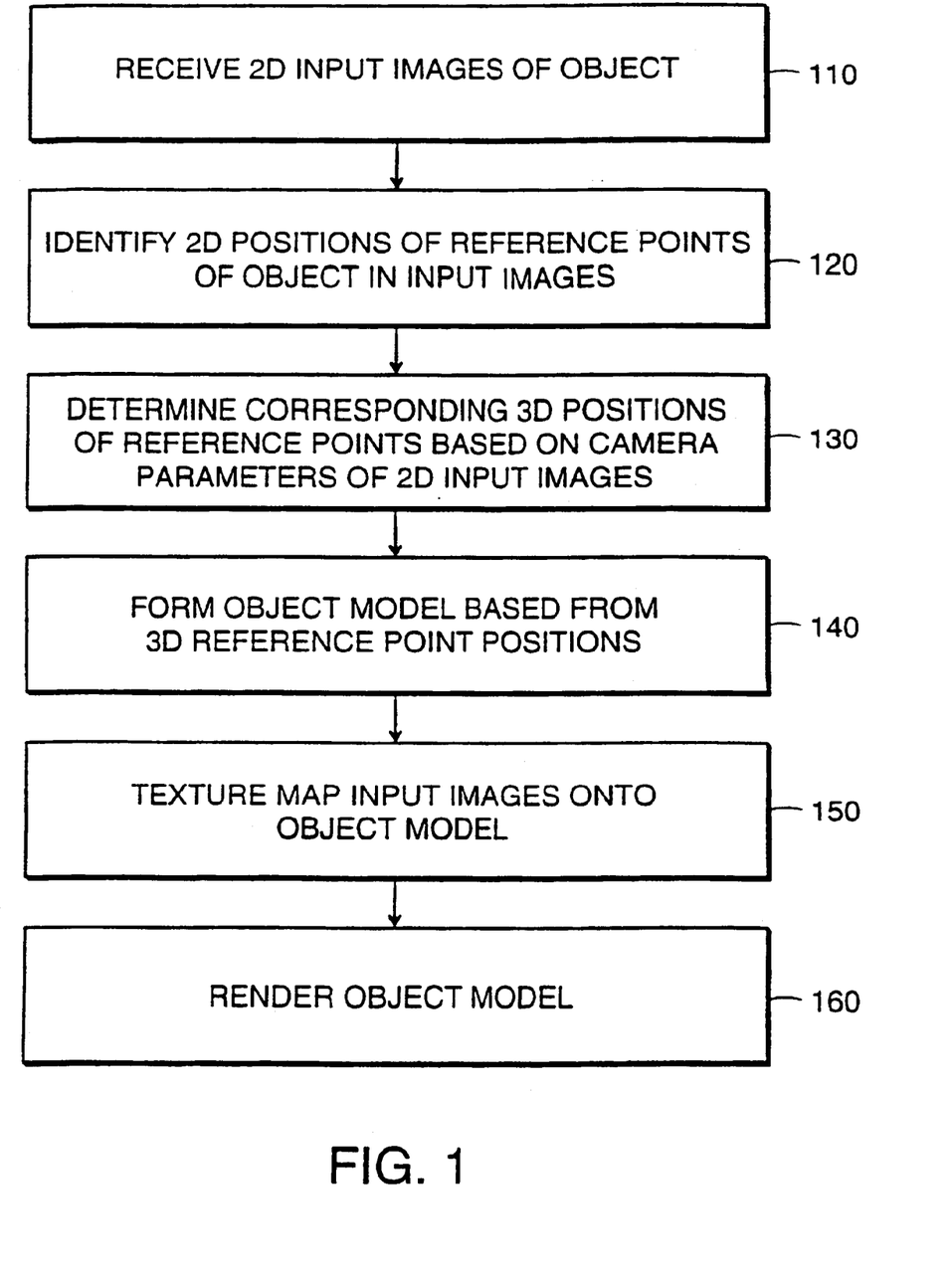
FIG. 1 is a flow diagram for generating 3D image data from 2D input data.

FIG. 1 is a flow diagram for generating a 3D, texture-mapped geometric model (i.e., a set of 3D image data collectively describing an object) based on 2D images of an object. The first step is to obtain image data for at least two 2D images of the object to be modelled (step 110). The 2D image data may be captured with a digital camera, by digitizing conventional photographs, or with any other suitable digital image generation means. The 2D image input data are arranged in 2D arrays of digital pixel values according to a 2D coordinate system defined by a set of u-v axes.

Next, the 2D positions (in u-v coordinates) of several predetermined reference points in the 2D input images are determined (step 120). The 2D reference point positions are used to calculate corresponding reference point positions in 3D space (i.e., a 3D coordinate system defined by a set of x-y-z axes) based on a set of camera parameters for each of the 2D input images (step 130). The camera parameters for each of the 2D images, which define the viewpoint (or "eyepoint") from which the 2D image was captured, may be known or may have to be calculated from the set of 2D images themselves. The 3D reference point positions are used to define the basic 3D object model (step 140. A texture, for example, a surface texture derived from the 2D input images, may be mapped onto the basic 3D object model to make it appear more realistic (step 150). Once the 3D model is complete, it can be rendered as desired using ray tracing or similar techniques. A more detailed explanation of the flow diagram of FIG. 1 is set forth with reference to FIGS. 3A–15.

Figure 3A:
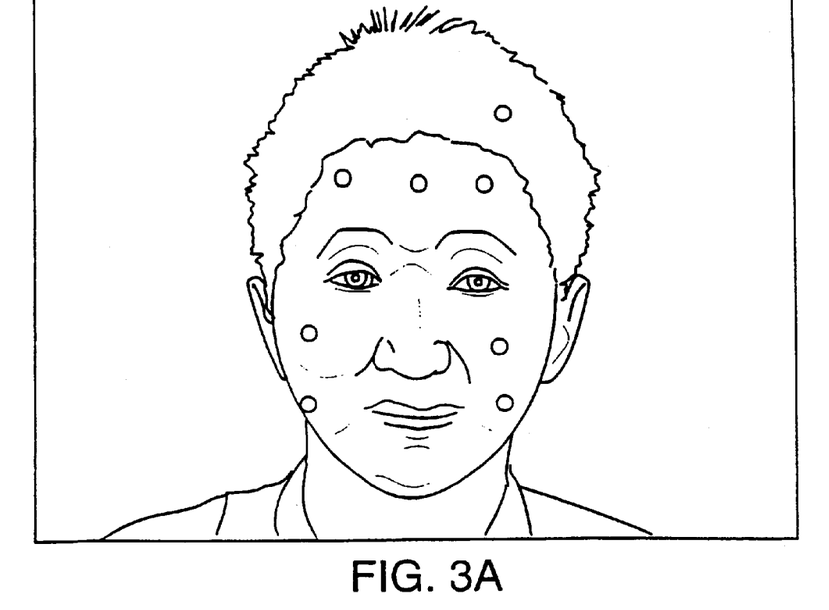
FIGS. 3A and 3B show sample 2D input images.
Figure 3B:
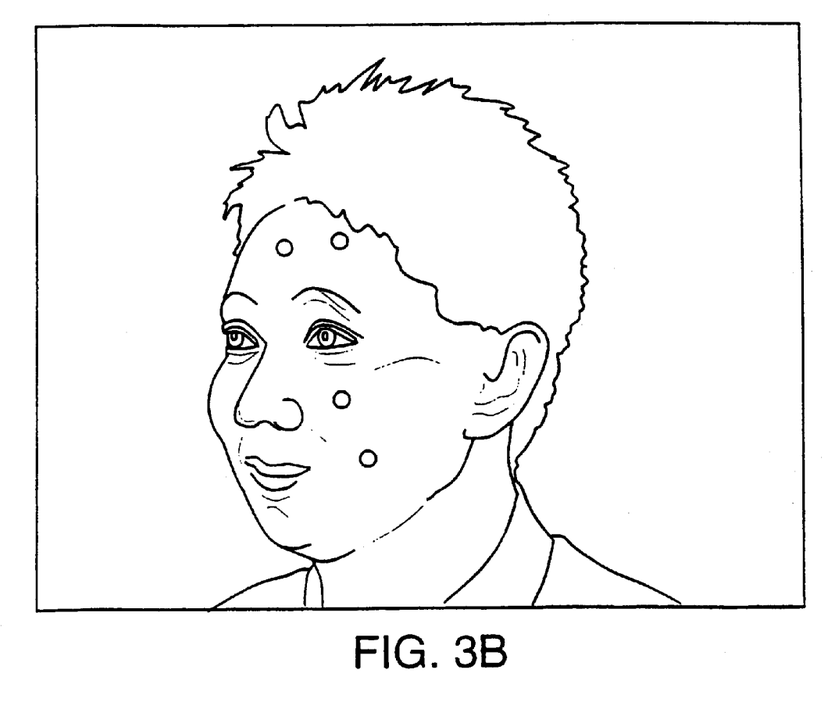
Figure 4:
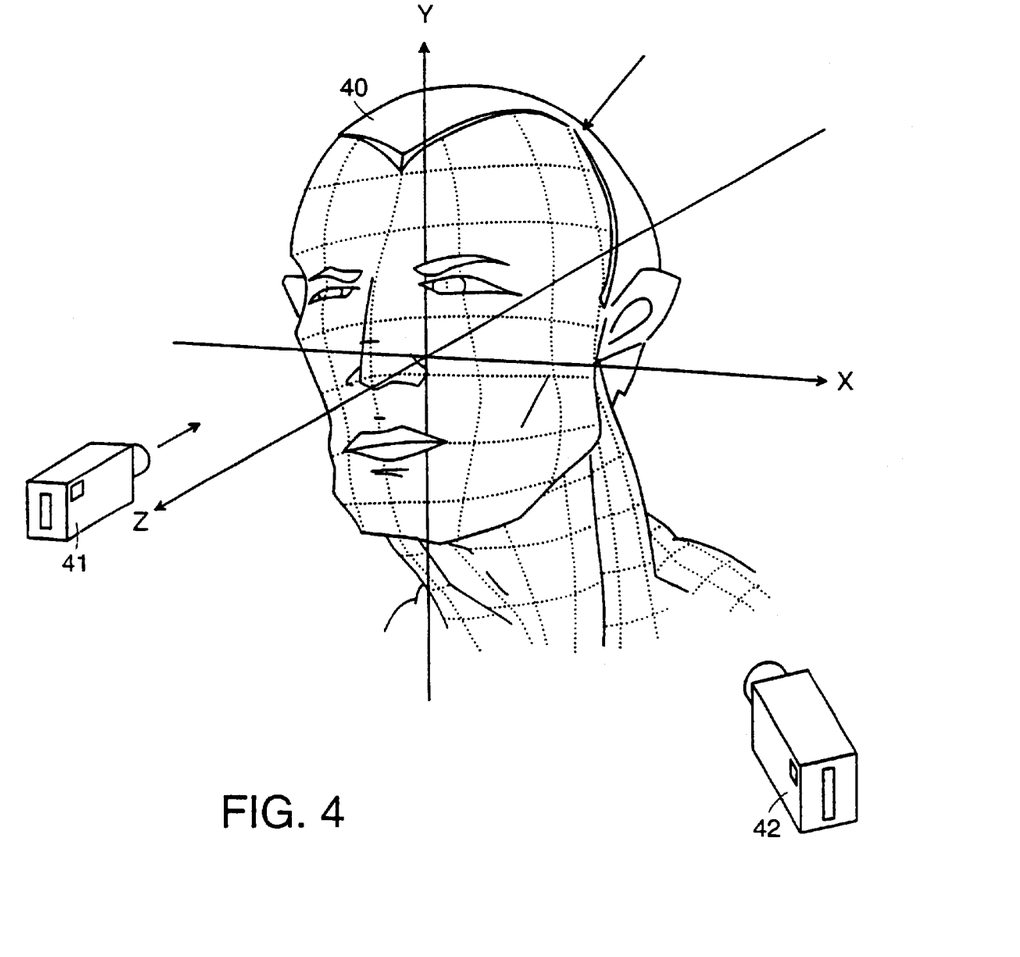
FIGS. 4 and 5 show abstract representations of a human head.

FIGS. 3A and 3B show examples of 2D input images that can be used to generate a 3D model. For the object—in this case, a human head—to be modelled properly, the 2D input images must depict the object from at least two different viewpoints. The viewpoint of a 2D image can be mathematically represented as a set of camera parameters that define the viewpoint in the 3D space in which the object appears in the image. The camera parameters, which can include factors such as position, orientation, scaling and perspective, either may be known for a particular 2D input image or may have to be calculated from the set of 2D image. FIG. 3A shows the head from a viewpoint directly in front of and level with the head, analogous to the viewpoint of camera 41 relative to the head 40 in FIG. 4. The viewpoint in FIG. 3B is slightly to the left side of the head, analogous to the viewpoint of camera 42 relative to the head 40 in FIG. 4.

Figure 5:
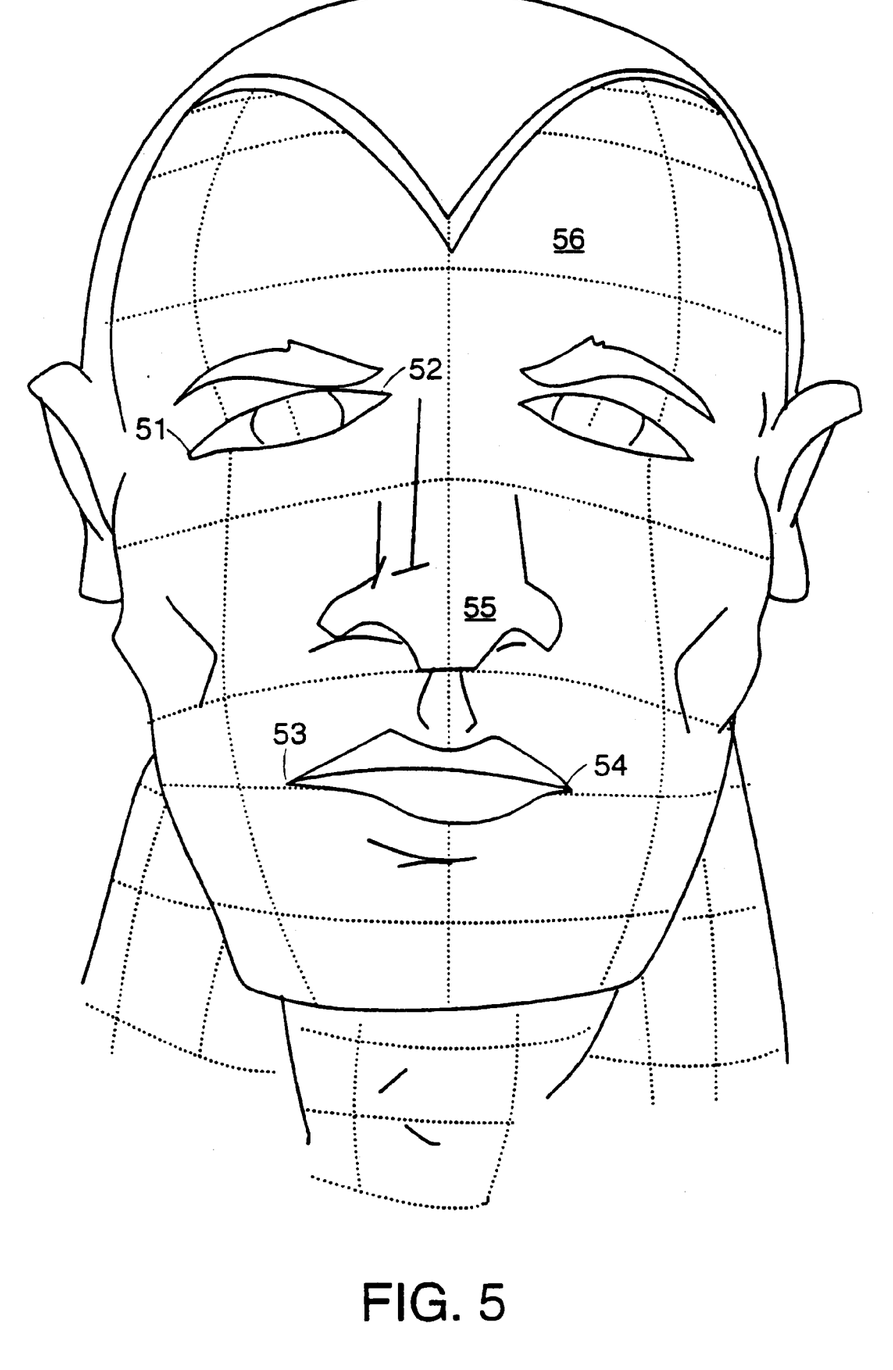

A 3D model of an object is generated based on a set of predetermined reference points within the 2D input images. The object in the 2D input images preferably has at least six reference points, generally selected to correspond to positions that convey distinctive information about the appearance or orientation of the object. In the example shown in FIGS. 7A and 7B, a total of 39 reference points were used. FIG. 5 shows five typical reference points—including points at the corners of the eyes 51, 52, points at the corners of the mouth 53, 54, the tip of the nose 55, and the center of the forehead 56—that could be used along with the other reference points in modelling the head 50.

Figure 7A:
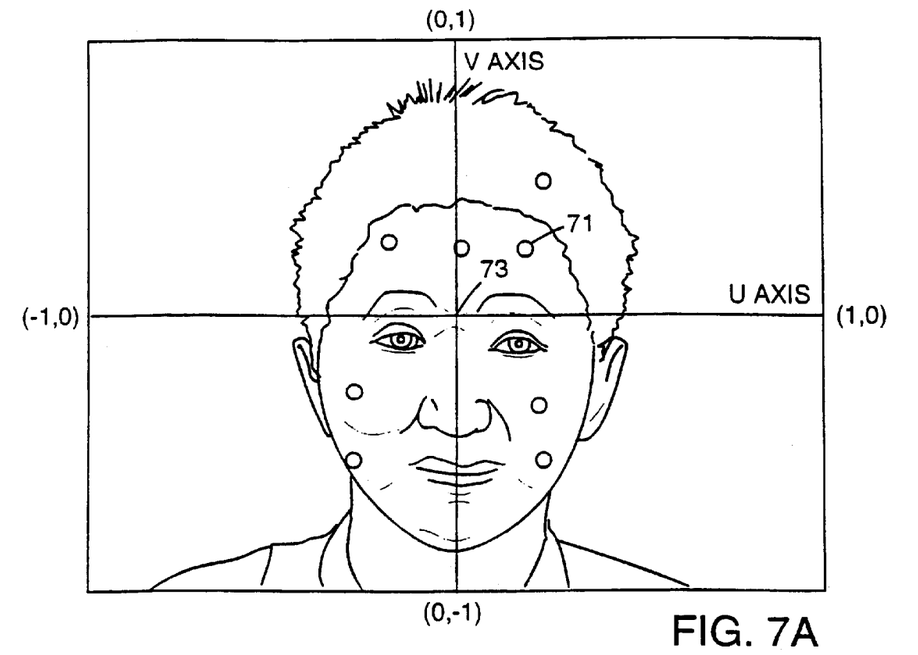
FIGS. 7A and 7B show the 2D input images of FIGS. 3A and 3B in their respective image spaces.
Figure 7B:
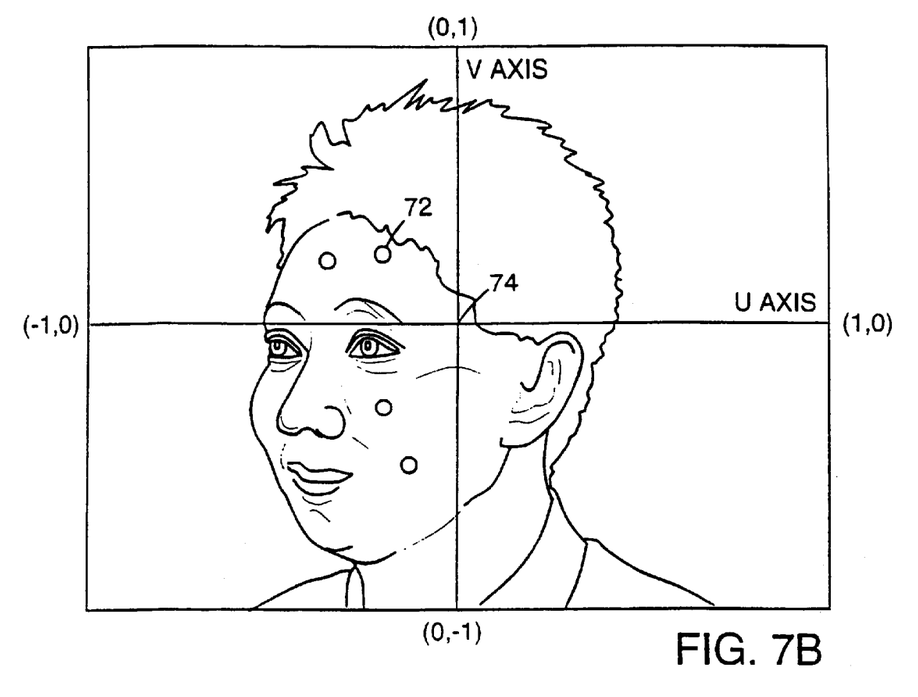

Each input image exists in its own independent image space—a two-dimensional u–v coordinate space generally corresponding to the boundaries of the input image without regard to the location of the object within the image. FIGS. 7A and 7B respectively show the coordinate systems that define the image spaces for the input images shown in FIGS. 3A and 3B. In each case, the coordinate system's origin (point 73 in FIG. 7A; point 74 in FIG. 7B) is placed at the center of the image, even though the center corresponds to different locations on the object to be modelled.

Each reference point for an object to be modelled is visible in at least two of the 2D input images, although no single 2D input image need show each reference point. At step 120 in the flow diagram of FIG. 1, the 2D positions of visible reference points of the object in each input image are determined relative to the input image's image space.

The 2D position of a specific reference point likely will vary in 2D input images having different image spaces. For example, for the human head shown in FIGS. 3A and 3B, one reference point is the dot directly above the subject's left eyebrow. This reference point is visible in both FIGS. 3A and 3B, and is shown in FIGS. 7A and 7B as reference points 71 and 72, respectively. Although reference points 71 and 72 represent the same point on the object, they have different 2D coordinates of approximately (0.182, 0.220) in FIG. 7A and (−0.218, 0.244) in FIG. 7B. This is because each 2D input image uses its own u–v coordinate system, as discussed above, which is independent of the other input images' coordinate systems.

Reference points in the input images may be identified using a variety of methods, including both automatic and non-automatic methods. The identification of reference points is described in "Three Dimensional Computer Vision" by Olivier Faugeras and in "Computer Facial Animation" by Parke and Waters, both of which are incorporated by reference. Further articles discussing facial feature recognition methods that may be used to identify reference points in an input image can be found at the following addresses on the world wide web:

http://www.cs.rug.nl/~peterkr/FACE/face.html
http://mambo.ucsc.edu/psl/fanl.html.

Non-automatic methods for identifying reference points may, for example, provide a user interface that allows a user to identify the reference points, either all at once (multi-point identification) or one at a time (point-by-point identification).

A typical multi-point identification utility may use a template or outline defining the basic structure of an object, or of a portion of an object, for which a match is sought. By using an interface, the user can achieve alignment (or an approximate alignment) between the template and the corresponding features of the object in an input image. When the user signals that a rough alignment has been achieved, the multi-point identification utility uses the alignment to extract 2D position data for the reference points.

Figure 8:
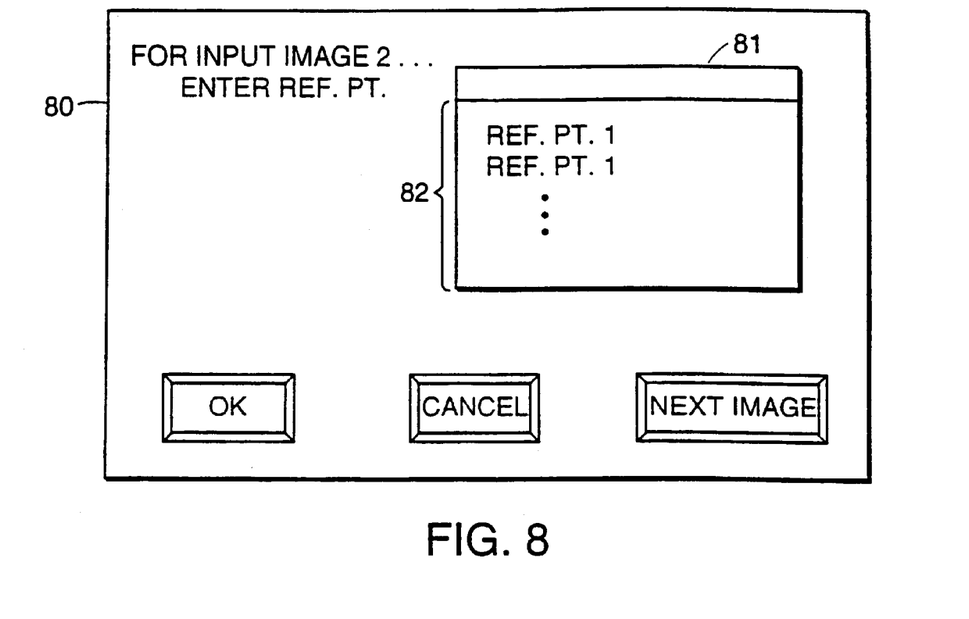
FIGS. 8 and 9 show example user interface windows.
Figure 9:
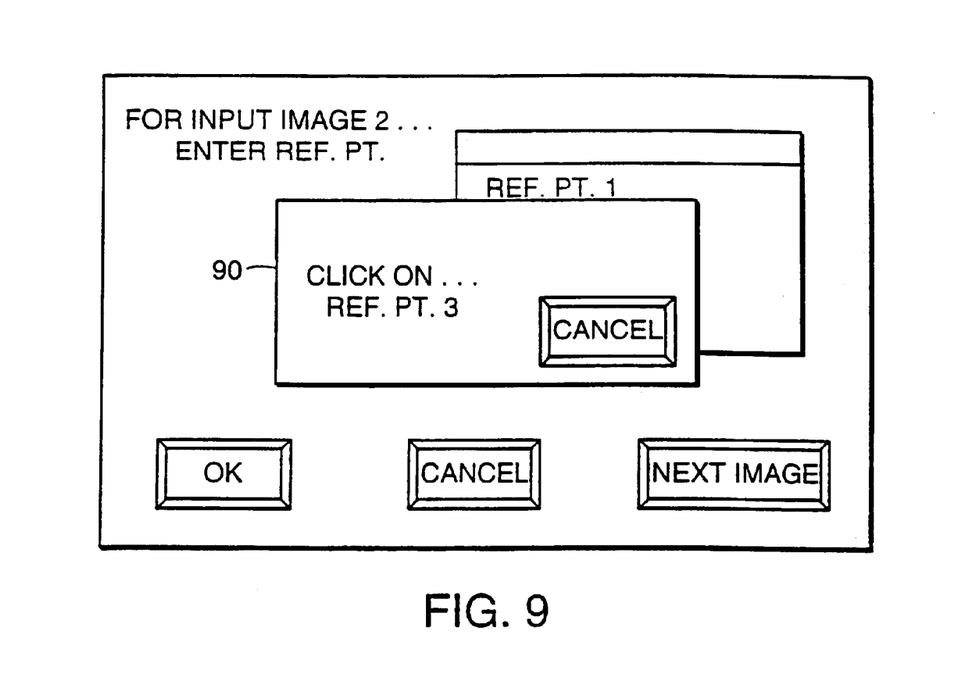

In a typical point-by-point identification processes, a user identifies reference points one-by-one by clicking the mouse cursor at desired locations on the input image of the object to be modelled. The dialog box 80 shown in FIG. 8 is an example of an interface that may be used to prompt the user to enter reference point names 81. Because each reference point necessarily occurs in more than one input image, once. a reference point name is created for one input image, that name is saved for use with other input images. Thus, for each reference point to be identified, the dialog box 80 in FIG. 8 gives the user the option of creating a new name 81 or selecting a reference point name from a list 82 of reference points already created. Once the user inputs or selects a name, a new dialog box 90, such as that shown in FIG. 9, prompts the user to input the 2D position of the corresponding reference point by, for example, clicking on the point in a displayed input image.

In some cases, a user may experience difficulty in specifying a precise position for a reference point. For example, the head shown in FIG. 5 includes both easily identified references points such as the corners of eyes 51, 52 and the corners of the mouth 53, 54, as well as points having locations that are more difficult to specify accurately, such as the tip of the nose 55 or the middle of the forehead 56, yet which nevertheless convey important information. To enable a user to more accurately identify the 2D position of a reference point in multiple input images, the point can be marked on the object before the input images are captured. The red spots appearing on the subject's face in FIGS. 3A and 3B are examples of such reference point markers.

Once the 2D positional data for the reference points have been determined, they are used to generate corresponding 3D positional data, which form the basis of the 3D object model. To do so, the camera parameters for each input image must be known already or they must be derived. If the position and orientation of the camera in each input image is known, the corresponding camera parameters can be calculated with relative ease. If the camera's position and orientation for an input image are not known, the camera parameters can be derived nevertheless from the identified 2D positions of the reference points in the input images (step 130 in FIG. 1). Each of these derived camera parameters and 3D positions is defined in an initial reconstruction space—a single, arbitrarily selected three-dimensional space. The initial reconstruction space produces camera parameters, if necessary, and 3D positions for the reference points of the object that are correct relative to each other. The initial reconstruction space, however, is unconstrained for seven degrees of freedom (DOF) for the object, which include rotation (3 DOF), translation (3 DOF), and uniform scaling (1 DOF). These seven DOFs will be resolved in a final reconstruction space.

Figure 10:
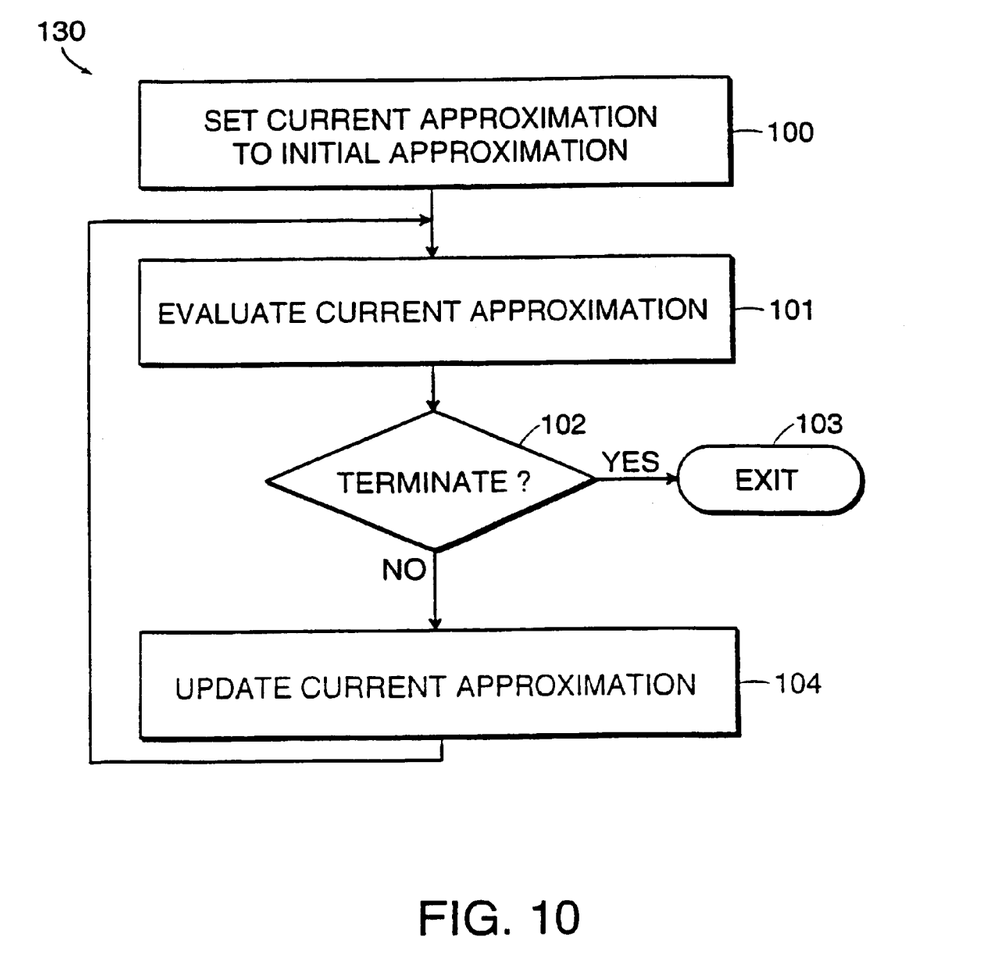
FIG. 10 is a flow diagram showing step 130 of FIG. 1 in greater detail.

A description of the procedures and techniques used in step 130 in FIG. 1 to determine camera parameters, if necessary, and 3D positional data for the reference points is provided with reference to the flow diagram of FIG. 10. The procedure involves iteratively approximating the camera-parameters and 3D positions until a termination condition is met.

Camera parameters can be represented by various formulations. For example, camera parameters for an input image a can be represented as a transformation matrix $T_a$ that maps 3D coordinate locations of points of the object to 2D coordinate locations of points in the image space of input image a. Each camera transformation matrix T includes components for rotation, translation, scaling, and perspective. Accordingly, T can be represented as a series of matrices $R_x R_y R_z \text{Tr} P$, where R represents the rotation about the indicated axis, Tr represents the translation, and P represents the image scale and perspective projection transform, which generally has the form:

$$P = \begin{bmatrix} uscale & 0 & 0 & 0 \\ 0 & vscale & 0 & 0 \\ 0 & 0 & 0 & p \\ 0 & 0 & 0 & 1 \end{bmatrix}$$

where uscale and vscale reflect the image scale and p reflects the projection depth. Each of the component matrices of T are determined in the initial reconstruction space with the same arbitrarily selected orientation and scale.

Using this representation, the relationship between 2D and 3D positions of a reference point 1 in image space a and in the 3D initial reconstruction space is as follows:

$$[w_{1,a}u_{1,a}, w_{1,a}v_{1,a}, w_{1,a}p, w_{1,a}] = [x_1, y_1, z_1, 1] R_{x,a} R_{y,a} R_{z,a} Tr_a P_a$$

where w is the homogenous coordinate. As noted above, p represents the projection depth, and is an arbitrary constant which may be ignored.

Current approximations for the camera parameters T for each input image and for the 3D positions $[x_1, y_1, z_1, 1]$ for each reference point are initialized with initial approximation values (step 100 in FIG. 10). In the general case where there is no known information about the object (such as its general shape), the initial approximation is chosen randomly.

The initial approximations of reference point locations can be improved by using an initial estimation model reflecting known properties of the object. For example, if the object is known to be containable within a generally spherical shape, a sphere centered at the origin of the initial reconstruction space can be used as the initial estimation model and random points within the sphere can be used as initial approximations for the reference points.

If more details are known, the initial estimation model can be refined to provide even more guidance. If the object is known to be a human head, as in the figures, the initial estimation model can be more detailed, such as the model of a generic human head 60 illustrated in FIG. 6. This initial estimation model 60 has a set of predefined control points at distinctive positions, such as the corners of eyes 61, 62, corners of the mouth 63, 64, the tip of the nose 65, and the center of the forehead 66. By centering the initial estimation model 60 at the origin in the initial reconstruction space, the 3D positions of the control points can be used as improved initial approximations for corresponding reference points of the object to be modeled.

Figure 6:
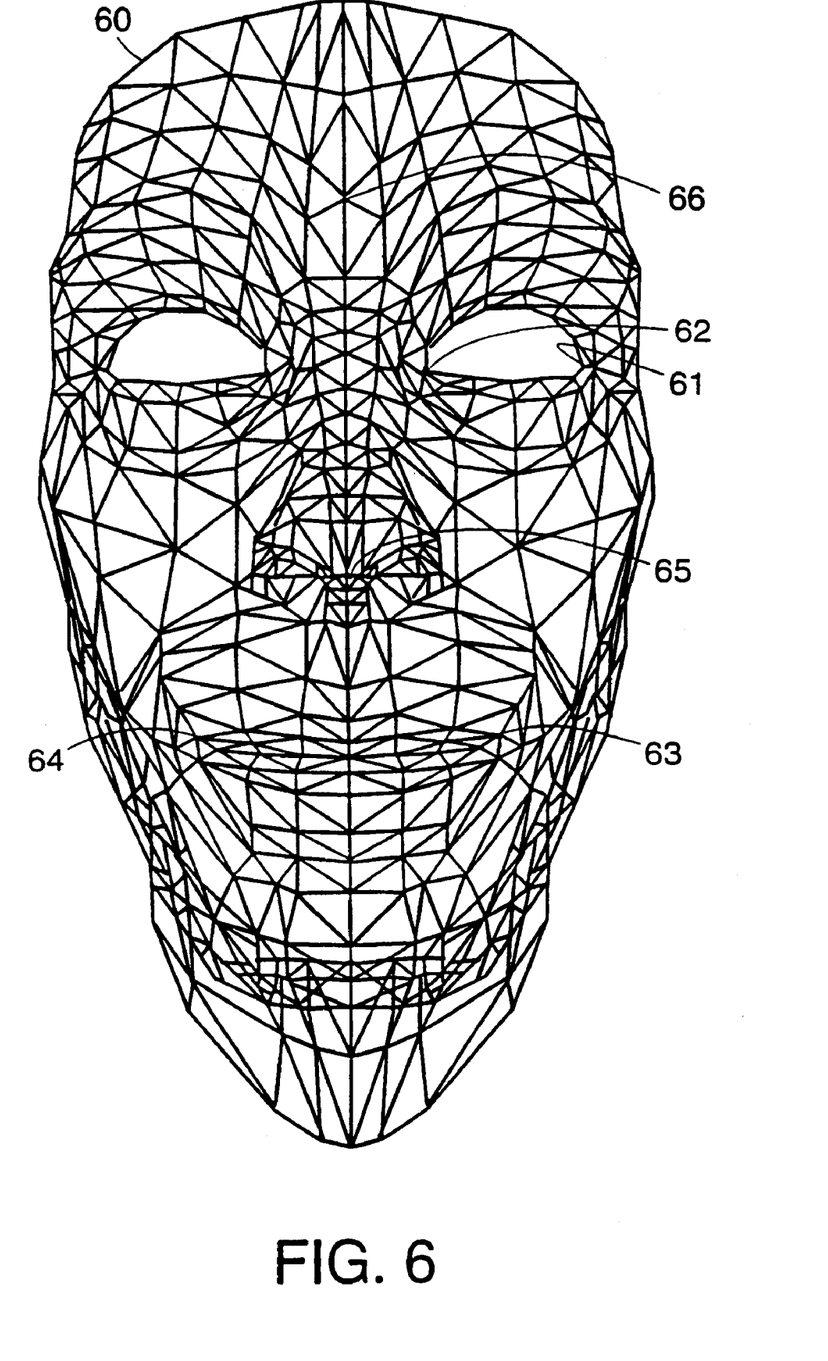
FIG. 6 shows an example of an initial estimation model.

Improved initial approximations for camera parameters of the input images also can be derived using known properties of the initial estimation model. For example, if the object is known to be solid, the camera viewpoint will be from the outside of the object facing towards the origin. If the human head 60 in FIG. 6 is used as the initial estimation model, improved initial approximations can be derived by comparing the known 3D positions of the control points in the initial estimation model 60 with the known 2D positions of reference points corresponding to the control points in an input image.

The current approximation (i.e., the current state of the estimation model) is then evaluated (step 101 in FIG. 10). A measurement of the current approximation accuracy is an error metric. As discussed above, the equation:

$$[w_{1,a}u_{1,a}, w_{1,a}v_{1,a}, w_{1,a}p, w_{1,a}] = [x_1, y_1, z_1, 1] T_a$$

describes the relationship between the 3D positions and 2D positions of a reference point in the initial reconstruction space and in the image space of input image a. When $[x_1, y_1, z_1, 1]$ and $T_a$, are approximated based on the current approximation, they produce 2D points $[u_a', v_a']$ in an approximated image space a'. The error metric is based on the distance between actual reference point locations $[u_a, v_a]$ determined in step 120 (FIG. 1) and reconstructed reference point locations $[u_a, v_a']$.

The current approximation is iteratively updated, thereby iteratively adapting the initial estimation model, (step 104 in FIG. 10) until a termination condition is met (steps 102, 103 in FIG. 10). If no termination condition is met, the current approximation is updated (step 104), and the process repeats for its next iteration (step 101). Examples of appropriate update techniques that can be used to bring the current approximation closer to its goal include the Fletcher-Reeves-Polak-Ribiere and Levenberg-Marquandt methods, which is described in WILLIAM H. PRESS, NUMERICAL RECIPES IN C: THE ART OF SCIENTIFIC COMPUTING (1995) (see section 10.7, describing variable metric methods, and section 15.5, describing nonlinear methods), incorporated by reference.

Termination conditions (step 102 in FIG. 10) and the subsequent consequences (e.g., exiting as in step 103) vary depending on the application. In some cases, limiting the elapsed time or the number of iterations during the computation by setting a predetermined limit may be appropriate. A computation that reaches this limit may terminate, for example, with an error or by returning the current approximation with a warning. Another possible termination condition is met if the error metric falls within a predetermined acceptable limit or range. In that case, the subsequent action could be to assign camera parameters and 3D positions based on the current approximation and then proceed to the next step (step 140) in the flow diagram of FIG. 1.

If a successful termination is reached during step 130 of FIG. 1, the 3D data, including the camera parameters, if necessary, and the 3D positional data, that were derived from the current approximation are used to form an object model (step 140 in FIG. 1).

Using the process described above, an initial reconstruction produces 3D reference points and camera parameters that are internally consistent and that reside in a common reconstruction space. However, the object model as a whole has seven degrees of freedom which have not yet been resolved at this point. Bringing the 3D reference points and camera parameters into a final reconstruction space assigns values to these other seven degrees of freedom. Moreover, bringing the 3D model into a final reconstruction space makes the data appropriate for use with other applications. For example, forming the model of the head shown in FIGS. 3A and 3B in the initial reconstruction space may cause the head to be oriented upside down, or sized to an unacceptably small scale. In the final reconstruction space, in contrast, an attempt is made to position the object appropriately for downstream applications. The specific definition of the final reconstruction space may vary depending on the application.

Once the camera parameters and 3D positions are successfully reconstructed, thereby forming an object model in 3D space, various methods may be used to create a texture map to be applied to the object model during rendering.

For objects that are generally cylindrical in shape, like the head shown in the figures, the derived 3D positions, now defined in the final reconstruction space, may be redefined in cylindrical space and represented by cylindrical coordinates (E, r, z). From these cylindrical coordinates, a polygonal mesh is created from the reference points using Delauney triangulation, which is described in R. SEDGEWICK, ALGORITHMS, pp. 409–10 (2d ed. 1988), incorporated by reference.

Figure 11:
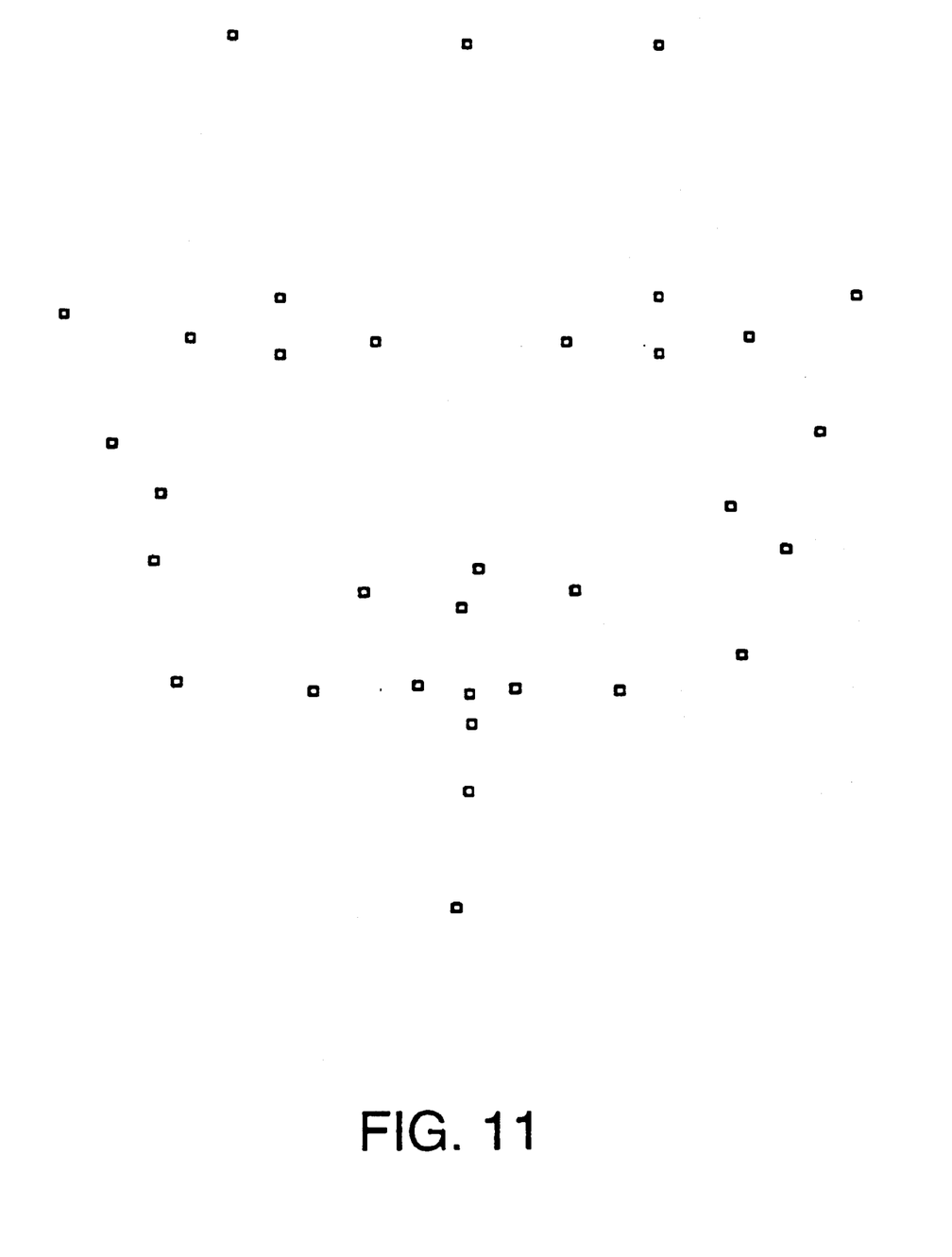
FIG. 11 shows an object model formed from representative 3D positions.
Figure 12:
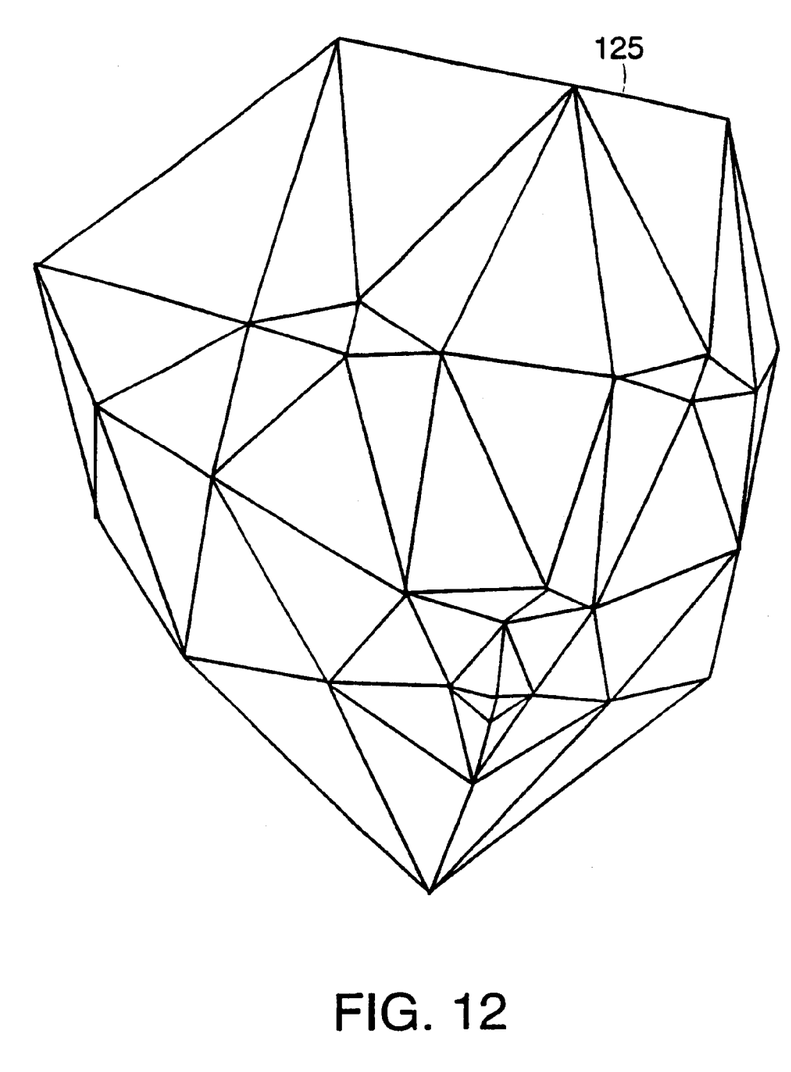
FIG. 12 shows a triangulated object model based on the object model of FIG. 11.

FIG. 11 illustrates the set of derived 3D positions for reference points of the object shown in FIGS. 3A and 3B. FIG. 12 illustrates the object model 125, in the form of a polygonal mesh, generated by connecting the 3D reference point positions shown in FIG. 11. For each input image, each triangle obtained from the Delauney triangulation is tested (using the reconstructed camera parameters) to determine if it is visible in the image under consideration. If a triangle is visible, the corresponding triangle of color information from the input image is transferred to the texture map at the cylindrical coordinates of the reference model triangle.

Figure 13:
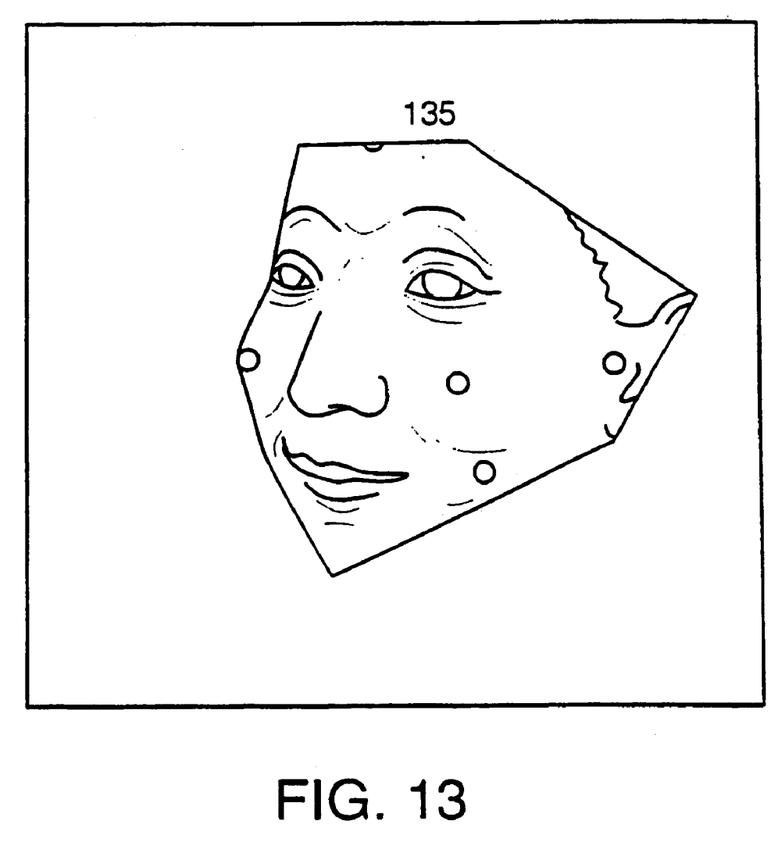
FIG. 13 shows a texture that can be applied to a 3D object model.

This process is repeated for each input image, and the texture data for a point on object model 125 is calculated as a weighted sum of the image data projected onto that point from the input images. The weights are determined based on the derived camera parameters for the input images and reflect the certainty that a point on an input image maps to the point on the object model 1200. Texture mapping is described in greater detail in TSUNEYA KURIHARA ET AL., A TRANSFORMATION METHOD FOR MODELING AND ANIMATION OF THE HUMAN FACE FROM PHOTOGRAPHS. FIG. 13 depicts a texture 135 generated as a result of the above-described process.

The 3D image of the object then can be rendered based on object model 125 in FIG. 12 and the texture 135 in FIG. 13 (step 160 in FIG. 1). If the object is of a known category, a detailed reference model having additional points based on known information about the object category may be used in rendering the 3D image. For example, FIG. 14 illustrates a detailed reference model 145 of a human head.

Similar to an initial estimation model, the reference model 145 includes control points at key positions corresponding to a subset of the reference points of the object. As shown, the reference model 145 typically has many other points, called non-control points, which provide additional details for the shape of the object.

The reference model 145 is adjusted, or adapted, to reflect the specific shape of the object being modelled by moving the control points to the 3D positions derived for the reference points of the object. The non-control points of the reference model 145 are repositioned in such a way that they are influenced by the displacement of the reference points while generally retaining the overall shape of the original reference model 145.

Figure 14:
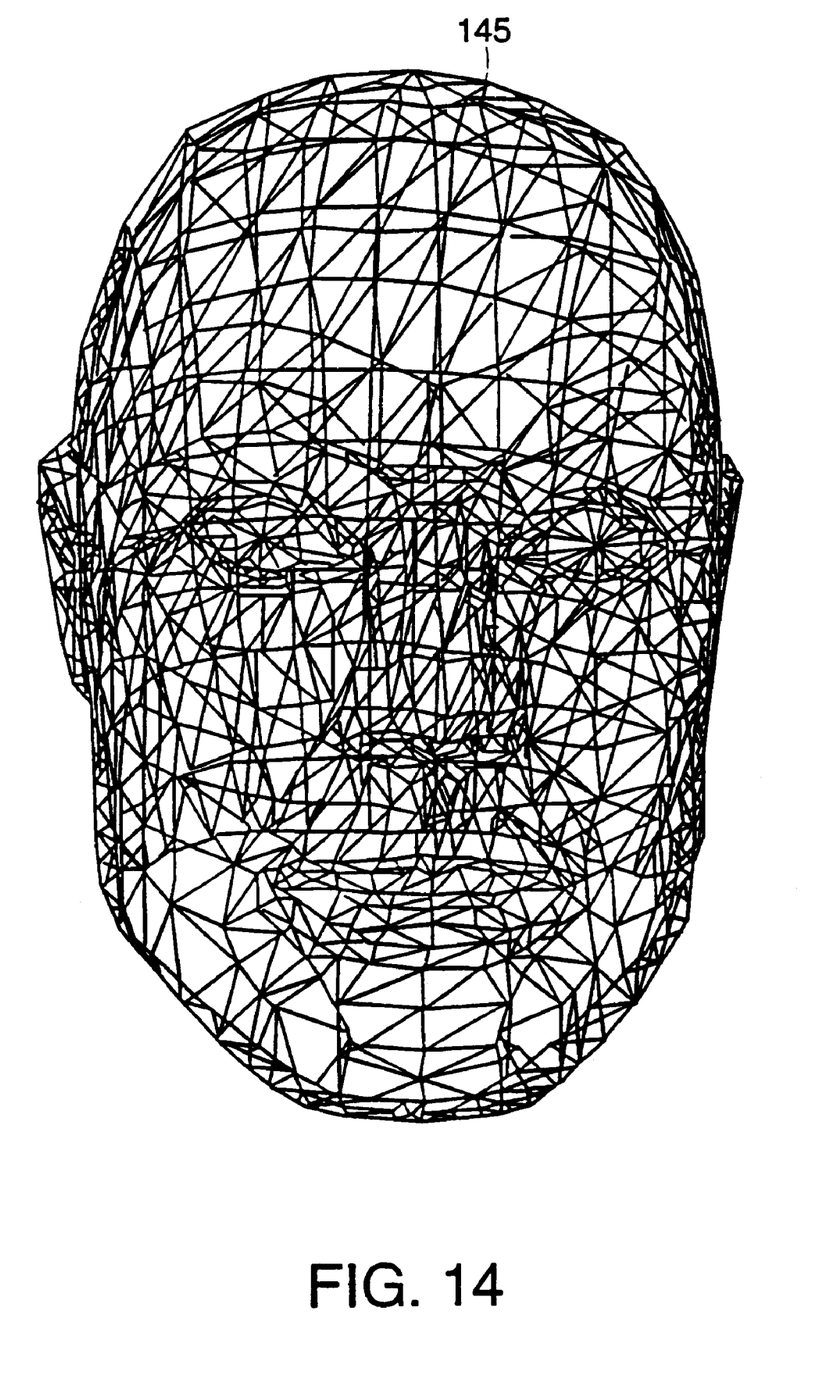
FIG. 14 shows a reference model of a human head.

When the reference model 145 is triangulated, as in FIG. 14, each non-control point is surrounded by three control points. The displacement of each non-control point is determined by interpolation of the displacements of the three surrounding control points. More specifically, the interpolation is based on interpolation parameters computed for each non-control point based on its distance from each of its three enclosing control points. An interpolation algorithm such as described in the KURIHARA ET AL. paper, referenced above, can be used for the interpolation operation.

Figure 15:
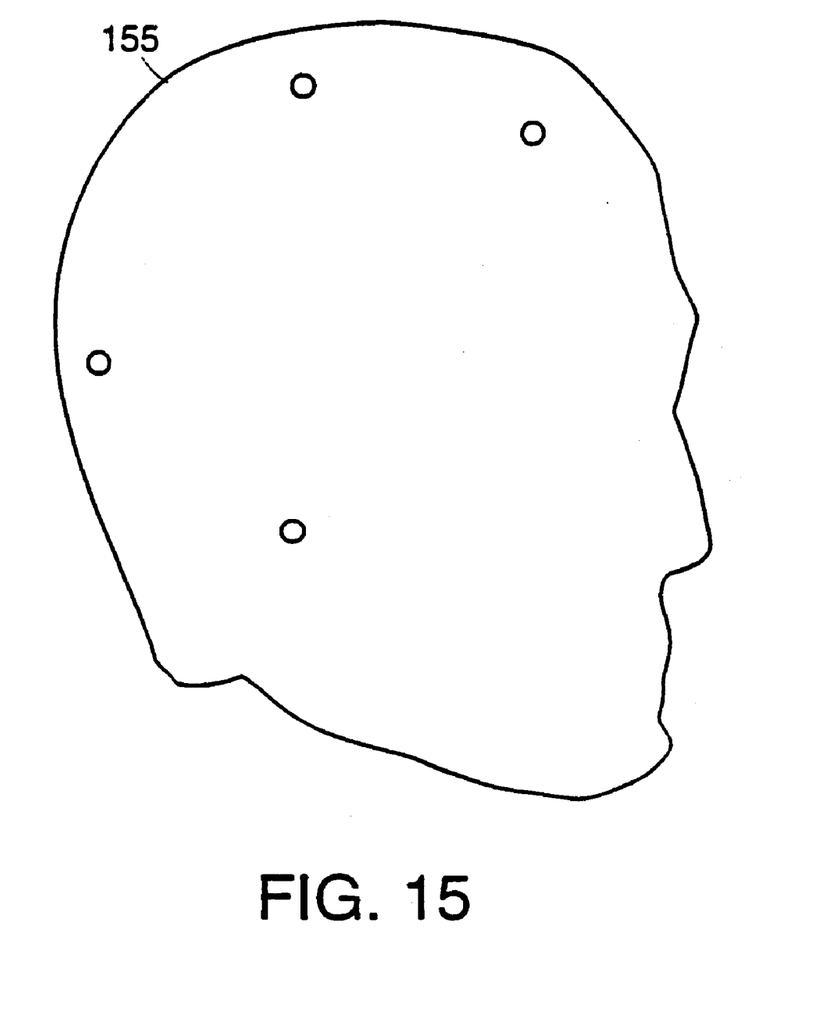
FIG. 15 shows a texture-mapped 3D object model.

FIG. 15 shows a rendering of the reference model 155, including both control points and non-control points, after being fully adjusted to reflect the derived 3D positions for the reference points of the object, and after the texture in FIG. 13 has been mapped onto the model 155.

The techniques described here can be implemented in hardware or software, or a combination of both. Preferably, these techniques are implemented in a software program executing in a computer system, such as that shown in FIG. 2, which includes a processor, a data storage system, and suitable input and output devices.

Various embodiments are within the scope of the following claims. For example, a variety of graphical user interfaces and various interface techniques may be used to determine the two-dimensional coordinate positions of the reference points in the input images. As an alternative to a forcing a user to designate reference positions, the positions can be generated automatically under certain circumstances. For example, in two-dimensional input images of a human head, points such as the corner of the eye or mouth may be detected automatically and their positions used as reference points.

The optimization method used to find approximations for camera parameters and 3D locations of reference points may vary. For example, the method may find the camera parameters first before starting the search for the 3D locations of reference points, or vice versa.

As discussed above, the generated 3D image data has various applications. In a computer system having a digital camera, a user interface for an application can request and receive the input images using the camera. The 3D image data, once derived and stored, can be used for a variety of applications such as virtual reality applications, computer games, and movie generation.

What is claimed is:

1. A computer-implemented method for generating 3D image data descriptive of an object, the method comprising:

receiving 2D image data for at least two input images of an object, each input image representing a different viewpoint of the object;

determining 2D position data for reference points of the object from the 2D image data, each of the reference points being included in at least two of the input images;

if camera parameters for the input images are not known, deriving (i) camera parameters for each of the input images, and (ii) 3D position data for the reference points, based on the 2D position data for the reference points of the input images; and creating a 3D texture-mapped model of the object by texture mapping from the 2D image data for the input images using the camera parameters for the input images and the 3D position data for reference points of the object;

wherein deriving 3D image data comprises:

using a reference model for the object providing 3D position data for points of the object, including control points corresponding to the reference points of the object and non-control points, wherein each non-control point has a known relation to surrounding control points;

repositioning the control points of the reference model based on the 3D position data determined for the reference points of the object; and repositioning non-control points of the reference model based on the repositioned control points and the known relation of the non-control points to the surrounding control points, wherein the texture mapping from the 2D image data for the input images further uses the derived 3D position data for the non-control points of the reference model.

2. The method of claim 1, further comprising rendering a 2D image from the 3D texture-mapped model.

3. The method of claim 1, wherein the object comprises a human head.

4. The method of claim 1, wherein the input images comprise digitized photographs.

5. The method of claim 1 further comprising receiving user input indicating reference points in input images.

6. The method of claim 5, wherein the determination of 2D position data is based on the user input received.

7. The method of claim 5, wherein receiving user input indicating reference points in input images comprises:

displaying input images to a user, wherein reference points are marked on the input images; and receiving user input as the user indicates the displayed marked reference points using an input device.

8. The method of claim 5 wherein receiving user input indicating reference points in input images comprises automatically selecting reference points based on a user-supplied alignment between a reference model and an input image.

9. The method of claim 8 wherein the reference model comprises a visual template.

10. The method of claim 8 further comprising providing a user interface that enables the user to align the reference model with the input image.

11. The method of claim 8 wherein the user-supplied alignment represents an alignment between the reference model and an entire object in an input image.

12. The method of claim 8 wherein the user-supplied alignment represents an alignment between the reference model and a portion of an object in an input image.

13. The method of claim 1, wherein deriving camera parameters for input images and 3D position data for reference points comprises using a non-linear optimization method beginning with an initial approximation.

14. The method of claim 13, wherein the non-linear optimization method comprises:

determining a current approximation of camera parameters for input images and 3D positions for reference points based on the initial approximation; and iteratively repeating, until a termination criterion is met:
determining an error metric based on reconstructed 2D position data for reference points of input images based on the current approximation;
and updating the current approximation.

15. The method of claim 14 further comprising deciding that a termination criterion has been met when the error metric is within a predetermined acceptable margin.

16. The method of claim 14 further comprising deciding that a termination criterion has been met after a predetermined number of iterations.

17. The method of claim 14 wherein the initial approximation comprises a random approximation.

18. The method of claim 14 wherein the initial approximation is based on an initial estimation model for the object.

19. A computer-implemented method for generating 3D image data of a head comprising:

receiving 2D image data for at least two input photographs of a head, each input photograph corresponding to a different viewpoint of the head;

determining 2D position data for reference points of the head from the 2D image data based on received user input indicating reference points in the input photographs, each of the reference points being included in at least two of the input photographs;

deriving, based on the 2D position data for the reference points of the input photographs, camera parameters for each of the input photographs and 3D position data for the reference point, using a non-linear optimization method beginning with an initial approximation, the nonlinear optimization method comprising:

determining a current approximation for camera parameters for input images and 3D positions for reference points based on the initial approximation; and iteratively repeating, until a termination criterion is met:
determining an error metric based on reconstructed 2D position data for
reference points of input images based on the current approximation; and
updating the current approximation;

determining 3D image data for the head by texture mapping from the 2D image data for the input photographs, using the camera parameters for the input photographs and the 3D position data for reference points of the heads; and rendering a 2D image from the 3D image data.

20. A memory device storing computer-readable instructions for aiding a computer to generate a 3D model of a head combined with registered image data of an object, the memory device comprising:

instructions for receiving 2D image data for at least two input images of an object, each input image corresponding to a different viewpoint of the object;

instructions for determining 2D position data for reference points of the object from the 2D image data, each of the reference points being included in at least two of the input images;

instructions for deriving, based on the 2D position data for the reference points of the input images, camera parameters for each of the input images and 3D position data for the reference points; and instructions for determining 3D image data for the object by texture mapping from the 2D image data for the input images, using the determined camera parameters for the input images and the determined 3D position data for reference points of the object.

* * * * *